United States Patent
Zhang et al.

(10) Patent No.: US 11,580,398 B2
(45) Date of Patent: Feb. 14, 2023

(54) DIAGNOSTIC SYSTEMS AND METHODS FOR DEEP LEARNING MODELS CONFIGURED FOR SEMICONDUCTOR APPLICATIONS

(71) Applicant: KLA-Tencor Corporation, Milpitas, CA (US)

(72) Inventors: Jing Zhang, Santa Clara, CA (US); Ravi Chandra Donapati, Ann Arbor, MI (US); Mark Roulo, Mountain View, CA (US); Kris Bhaskar, San Jose, CA (US)

(73) Assignee: KLA-Tenor Corp., Milpitas, CA (US)

( * ) Notice: Subject to any disclaimer, the term of this patent is extended or adjusted under 35 U.S.C. 154(b) by 826 days.

(21) Appl. No.: 15/694,719

(22) Filed: Sep. 1, 2017

(65) Prior Publication Data
US 2018/0107928 A1 Apr. 19, 2018

Related U.S. Application Data

(60) Provisional application No. 62/408,402, filed on Oct. 14, 2016.

(51) Int. Cl.
*G06N 3/08* (2006.01)
*G06N 3/04* (2006.01)
(Continued)

(52) U.S. Cl.
CPC ......... *G06N 3/082* (2013.01); *G06K 9/6261* (2013.01); *G06K 9/6274* (2013.01);
(Continued)

(58) Field of Classification Search
CPC ......... G06T 7/0004; G06T 2207/10056; G06T 2207/20081; G06T 2207/20084;
(Continued)

(56) References Cited

U.S. PATENT DOCUMENTS

| 5,604,529 A | 2/1997 | Kuga et al. |
| 7,570,796 B2 | 8/2009 | Zafar et al. |

(Continued)

FOREIGN PATENT DOCUMENTS

| CN | 105612601 | 5/2016 |
| CN | 105719291 | 6/2016 |

(Continued)

OTHER PUBLICATIONS

Ardizzone et al.,"Saliency Based Image Cropping," ICIAP 2013, Part I, LNCS 8156, pp. 773-782, 2013 (Year: 2013).*

(Continued)

*Primary Examiner* — Miranda M Huang
*Assistant Examiner* — Yao David Huang
(74) *Attorney, Agent, or Firm* — Ann Marie Mewherter

(57) ABSTRACT

Methods and systems for performing diagnostic functions for a deep learning model are provided. One system includes one or more components executed by one or more computer subsystems. The one or more components include a deep learning model configured for determining information from an image generated for a specimen by an imaging tool. The one or more components also include a diagnostic component configured for determining one or more causal portions of the image that resulted in the information being determined and for performing one or more functions based on the determined one or more causal portions of the image.

38 Claims, 5 Drawing Sheets

(51) Int. Cl.
  *G06K 9/62* (2022.01)
  *G06V 10/40* (2022.01)
  *G06V 10/44* (2022.01)
  *G06T 7/00* (2017.01)
  *G06N 3/082* (2023.01)
  *G06N 3/084* (2023.01)

(52) U.S. Cl.
  CPC ........... *G06N 3/0454* (2013.01); *G06N 3/084* (2013.01); *G06T 7/0004* (2013.01); *G06V 10/40* (2022.01); *G06V 10/454* (2022.01); *G06K 9/6256* (2013.01); *G06K 9/6263* (2013.01); *G06K 9/6267* (2013.01); *G06T 2207/10056* (2013.01); *G06T 2207/10061* (2013.01); *G06T 2207/20081* (2013.01); *G06T 2207/20084* (2013.01); *G06T 2207/30148* (2013.01); *G06V 2201/06* (2022.01)

(58) Field of Classification Search
  CPC ............ G06T 2207/30148; G06K 9/46; G06K 9/6261; G06K 9/6256; G06K 9/6263; G06K 9/6267; G06N 3/0454; G06N 3/082; G06N 3/084
  See application file for complete search history.

(56) References Cited

U.S. PATENT DOCUMENTS

| | | | |
|---|---|---|---|
| 7,676,077 B2 | 3/2010 | Kulkarni et al. | |
| 8,126,255 B2 | 2/2012 | Bhaskar et al. | |
| 8,664,594 B1 | 3/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,171,364 B2 | 10/2015 | Wu et al. | |
| 9,222,895 B2 | 12/2015 | Duffy et al. | |
| 9,324,022 B2 | 4/2016 | Williams, Jr. et al. | |
| 9,430,824 B2 | 8/2016 | Sezginer et al. | |
| 2007/0171404 A1 | 7/2007 | Ben-Tulila et al. | |
| 2009/0037134 A1 | 2/2009 | Kulkarni et al. | |
| 2009/0080759 A1* | 3/2009 | Bhaskar | G06T 1/20 382/141 |
| 2010/0226564 A1* | 9/2010 | Marchesotti | G06V 10/462 382/159 |
| 2013/0279795 A1 | 10/2013 | Shlain et al. | |
| 2013/0294680 A1* | 11/2013 | Harada | H01L 22/20 382/149 |
| 2014/0254922 A1* | 9/2014 | Wang | G06K 9/4671 382/159 |
| 2014/0270495 A1* | 9/2014 | Tu | G06T 7/11 382/160 |
| 2015/0046121 A1 | 2/2015 | Dziura et al. | |
| 2015/0227816 A1* | 8/2015 | Du | G06V 10/469 382/156 |
| 2016/0025648 A1 | 1/2016 | Duffy et al. | |
| 2017/0032551 A1* | 2/2017 | Fried | G06T 5/005 |
| 2017/0140524 A1 | 5/2017 | Karsenti et al. | |
| 2017/0148226 A1 | 5/2017 | Zhang et al. | |
| 2017/0149690 A1* | 5/2017 | Le Rudulier | H04L 47/821 |
| 2017/0177997 A1* | 6/2017 | Karlinsky | G06K 9/6271 |
| 2017/0193400 A1 | 7/2017 | Bhaskar et al. | |
| 2017/0193680 A1 | 7/2017 | Zhang et al. | |
| 2017/0194126 A1 | 7/2017 | Bhaskar et al. | |
| 2017/0200260 A1 | 7/2017 | Bhaskar et al. | |
| 2017/0200264 A1 | 7/2017 | Park et al. | |
| 2017/0200265 A1 | 7/2017 | Bhaskar et al. | |
| 2017/0308770 A1* | 10/2017 | Jetley | G06V 10/454 |
| 2018/0060702 A1* | 3/2018 | Ma | G06T 7/0004 |

FOREIGN PATENT DOCUMENTS

| | | |
|---|---|---|
| JP | H 7-222202 | 8/1995 |
| JP | H 8-21803 A | 1/1996 |
| JP | 2006-293820 | 10/2006 |
| JP | 5520434 | 6/2014 |
| TW | 201350836 | 12/2013 |
| TW | I456190 | 10/2014 |
| WO | 2015/100099 | 7/2015 |

OTHER PUBLICATIONS

H. Noh, S. Hong and B. Han, "Learning Deconvolution Network for Semantic Segmentation," 2015 IEEE International Conference on Computer Vision (ICCV), 2015, pp. 1520-1528, doi: 10.1109/ICCV.2015.178. (Year: 2015).*
Luisa M. Zintgraf et al., "A New Method to Visualize Deep Neural Networks," arXiv:1603.02518v2 [cs.CV] Jun. 9, 2016. Retrieved from <https://arxiv.org/pdf/1603.02518v2.pdf> (Year: 2016).*
Freixenet et al., "Yet Another Survey on Image Segmentation: Region and Boundary Information Integration," A. Heyden et al. (Eds.): ECCV 2002, LNCS 2352, pp. 408-422, 2002 (Year: 2002).*
Hu et al., "Harnessing Deep Neural Networks with Logic Rules" arXiv:1603.06318v3 [cs.LG] Jul. 19, 2016 (Year: 2016).*
Sivaraman et al, "A General Active-Learning Framework for On-Road Vehicle Recognition and Tracking," in IEEE Transactions on Intelligent Transportation Systems, vol. 11, No. 2, pp. 267-276, Jun. 2010 (Year: 2010).*
Vezhnevets et al., "Active learning for semantic segmentation with expected change," 2012 IEEE Conference on Computer Vision and Pattern Recognition, 2012, pp. 3162-3169 (Year: 2012).*
Friedman, "Greedy Function Approximation: A Gradient Boosting Machine," The Annals of Statistics, 29(5): 1189-1232, May 1999.
Hand et al., "Principles of Data Mining (Adaptive Computation and Machine Learning)," MIT Press, Aug. 1, 2001, 578 pages.
He et al., "Deep Residual Learning for Image Recognition," arXiv:1512.03385v1, Dec. 10, 2015, 12 pages.
International Search Report for PCT/US2017/052093 dated Dec. 20, 2017.
Jebara, "Discriminative, Generative, and Imitative Learning," MIT Thesis, Feb. 2002, 212 pages.
Krizhevsky et al., "ImageNet Classification with Deep Convolutional Neural Networks," Neural Information Processing Systems (NIPS) Jan. 2012, 9 pages.
Lin et al., "Network In Network," arXiv: 1312.4400, Mar. 4, 2014, 10 pages.
Ren et al., "Faster R-CNN: Towards Real-Time Object Detection with Region Proposal Networks" Neural Information Processing Systems (NIPS) 2015, Jun. 4, 2015, 9 pages.
Samek et al., "Evaluating the visualization of what a Deep Neural Network has learned," arXiv: 1509.06321, Sep. 21, 2015, 13 pages.
Shrikumar et al., "Not Just A Black Box: Learning Important Features through propagating activation differences," arXiv: 1605.01713, Apr. 11, 2017, 6 pages.
Simonyan et al., "Deep inside convolutional networks: Visualising image classification models and saliency maps," presented at International Conference on Learning Representations (ICLR) Workshop 2014, Apr. 19, 2014, 8 pages.
Simonyan et al., "Very Deep Convolutional Networks for Large-Scale Image Recognition," presented at International Conference on Learning Representations (ICLR) 2015, Apr. 10, 2015, 14 pages.
Sugiyama, "Introduction to Statistical Machine Learning," Morgan Kaufmann, Oct. 9, 2015, 534 pages.
Sundararajan et al., "Axiomatic Attribution for Deep Networks," arXiv: 1703.01365, Jun. 13, 2017, 11 pages.
Szegedy et al., "Going Deeper with Convolutions," 2015 IEEE Conference on Computer Vision and Pattern Recognition (CVPR), Jun. 2015, 9 pages.
Zeiler et al., "Visualizing and understanding convolutional networks," European Conference on Computer Vision (ECCV) 2014, Sep. 2014, pp. 818-833.
U.S. Appl. No. 15/603,249 by Zhang et al., filed May 23, 2017 (submitted as U.S. Patent Application Publication No. 2017/0345140 published Nov. 30, 2017).

* cited by examiner

DIAGNOSTIC SYSTEMS AND METHODS FOR DEEP LEARNING MODELS CONFIGURED FOR SEMICONDUCTOR APPLICATIONS

BACKGROUND OF THE INVENTION

1. Field of the Invention

The present invention generally relates to diagnostic methods and systems for deep learning models configured for semiconductor applications.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc.

Advances in deep learning have made deep learning an attractive framework for use in defect detection and classification. While such frameworks have proven useful for defect classification and other functions, the frameworks themselves also make it difficult to know whether or not the deep learning framework is operating correctly. For example, in the case of defect classification, currently used approaches for performing quality assurance on a classifier include classical metrics in machine learning such as accuracy, confusion matrix, and sensitivity on an offline test dataset and online/in-field evaluation. In addition, currently used approaches for performing data augmentation include having a domain expert or an algorithm expert guide the valid and critical transformation/augmentation or performing data augmentation based on physic laws and/or common sense.

There are, however, a number of disadvantages for currently used quality assurance and data augmentation methods and systems. For example, the currently used quality assurance approaches described above cannot identify the situation in which a classifier makes a correct prediction based on wrong causal features, especially for deep learning classifiers. In another example, the currently used quality assurance approaches described above treat machine learning and deep learning algorithms as a black box. In an additional example, the currently used approaches for performing data augmentation cannot be used to directly improve/correct a poorly trained classifier.

Accordingly, it would be advantageous to develop systems and methods for performing diagnostic functions for a deep learning model that do not have one or more of the disadvantages described above.

SUMMARY OF THE INVENTION

The following description of various embodiments is not to be construed in any way as limiting the subject matter of the appended claims.

One embodiment relates to a system configured to perform diagnostic functions for a deep learning model. The system includes one or more computer subsystems and one or more components executed by the one or more computer subsystems. The one or more components includes a deep learning model configured for determining information from an image generated for a specimen by an imaging tool. The one or more components also include a diagnostic component configured for determining one or more causal portions of the image that resulted in the information being determined and for performing one or more functions based on the determined one or more causal portions of the image. The system may be further configured as described herein.

An additional embodiment relates to another system configured to perform diagnostic functions for a deep learning model. This system is configured as described above. This system also includes an imaging tool configured for generating images of a specimen. The computer subsystem(s) are, in this embodiment, configured for acquiring the images. This embodiment of the system may be further configured as described herein.

Another embodiment relates to a computer-implemented method for performing diagnostic functions for a deep learning model. The method includes determining information from an image generated for a specimen by an imaging tool by inputting the image to a deep learning model. The method also includes determining one or more causal portions of the image that resulted in the information being determined by inputting the information to a diagnostic component. In addition, the method includes performing one or more functions based on the determined one or more causal portions of the image with the diagnostic component. The deep learning model and the diagnostic component are included in one or more components executed by one or more computer systems.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for performing diagnostic functions for a deep learning model. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
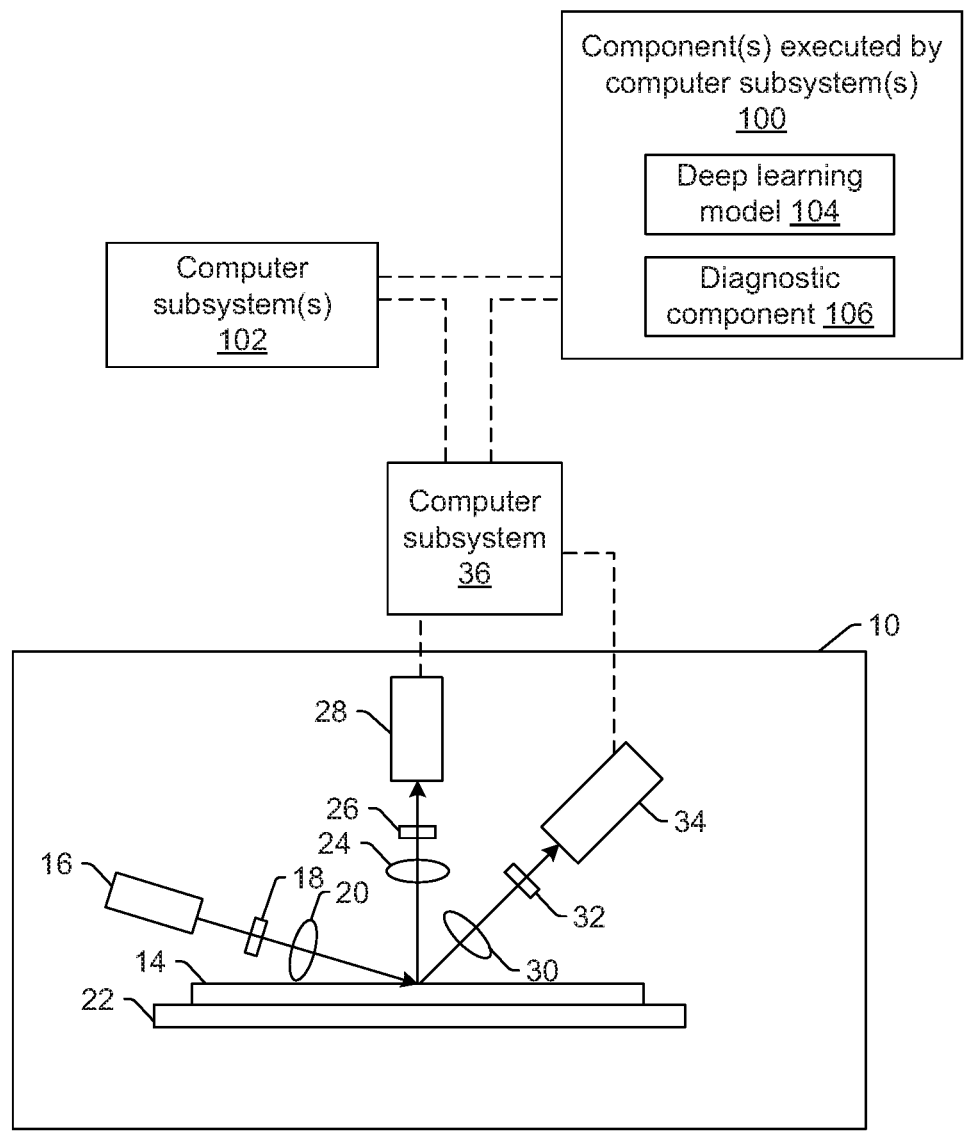
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In addition, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to perform diagnostic functions for a deep learning model. Some embodiments described herein are configured as systems with optional visualization capability for causal understanding and guided training of a deep learning model for semiconductor applications such as inspection and metrology. For example, the embodiments described herein provide a system configured to perform quality assurance and causal understanding for a deep learning model. In particular, as described further herein, the embodiments are configured for generating causal information (e.g., causal image/vector) through several possible methods and/or algorithms. In addition, by using the causal information, the embodiments can quantitatively determine the model performance. Furthermore, the systems can use the information gained by quality assurance and/or causal understanding to perform one or more functions such as providing guidance on data augmentation and/or fine-tuning the process to further improve the accuracy of the deep learning model. In other words, by using causal information (e.g., causal image/vector) in augmentation, the embodiments can improve the deep learning model further. Moreover, the embodiments described herein provide semi-supervised detect or region detection, which can advantageously reduce manual labeling efforts.

As described further herein, deep learning models can perform functions such as image composition, feature extraction, and classification by using an end-to-end neural network structure such as those described further herein. Although such a strategy grants the deep learning model excellent accuracy for prediction, it also essentially makes the deep learning model a black box (in that the inner workings of the deep learning model are not necessarily available for human comprehension). The embodiments described herein are aimed to provide a system for diagnosing a trained deep learning model and optionally to use a visualization tool to augment and/or generate regions of interest (ROIs) in the input data for applications such as fine-tuning the deep learning model.

One embodiment of a system configured to perform diagnostic functions for a deep learning model is shown in FIG. 1. The system includes one or more computer subsystems (e.g., computer subsystem 36 and computer subsystem(s) 102) and one or more components 100 executed by the one or more computer subsystems. In some embodiments, the system includes imaging tool 10 configured for generating images of a specimen. In the embodiment of FIG. 1, the imaging tool is configured for scanning light over or directing light to a physical version of the specimen while detecting light from the specimen to thereby generate the images for the specimen. The imaging tool may also be configured to perform the scanning (or directing) and the detecting with multiple modes.

In one embodiment, the specimen is a wafer. The wafer may include any wafer known in the art. In another embodiment, the specimen is a reticle. The reticle may include any reticle known in the art.

In one embodiment, the imaging tool is configured as an optical based imaging tool. In this manner, in some embodiments, the images are generated by an optical based imaging tool. In one such example, in the embodiment of the system shown in FIG. 1, optical based imaging tool 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The imaging tool may be configured to direct the light to the specimen at different angles of incidence at different times. For example, the imaging tool may be configured to alter one or more characteristics of one or more elements of the illumination subsystem such that the light can be directed to the specimen at an angle of incidence that is different than that shown in FIG. 1. In one such example, the imaging tool may be configured to move light source 16, optical element 18, and lens 20 such that the light is directed to the specimen at a different oblique angle of incidence or a normal (or near normal) angle of incidence.

In some instances, the imaging tool may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated front each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the imaging tool may be configured to alter one or more of the elements of the illumination subsystem based on the type of illumination to be used for imaging.

The imaging tool may also include a scanning subsystem configured to cause the light to be scanned over the specimen. For example, the imaging tool may include stage 22 on which specimen 14 is disposed during inspection. The scanning subsystem may include any suitable mechanical and/or robotic assembly (that includes stage 22) that can be configured to move the specimen such that the tight can be scanned over the specimen. In addition, or alternatively, the imaging toot may be configured such that one or more optical elements of the imaging tool perform some scanning of the light over the specimen. The light may be scanned over the specimen in any suitable fashion such as in a serpentine-like path or in a spiral path.

The imaging tool further includes one or more detection channels. At least one of the one or more detection channels includes a detector configured to detect light from the specimen due to illumination of the specimen by the tool and to generate output responsive to the detected light. For example, the imaging tool shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of tight from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging tool that includes two detection channels, the imaging tool may include a different number of detection channels (e.g., only one detection channel or two or more detection channels). In one such instance, the detection channel formed by collector 30, element 32, and detector 34 may form one side channel as described above, and the imaging tool may include an additional detection channel (not shown) formed as another side channel that is positioned on the opposite side of the plane of incidence. Therefore, the imaging tool may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging tool may also include two or more side channels configured as described above. As such, the imaging tool may include at least three channels (i.e., one top channel and two side channels), and each of the at least three channels has its own collector, each of which is configured to collect light at different scattering angles than each of the other collectors.

As described further above, each of the detection channels included in the imaging tool may be configured to detect scattered light. Therefore, the imaging tool shown in FIG. 1 may be configured for dark field (DF) imaging of specimens. However, the imaging tool may also or alternatively include detection channel(s) that are configured for bright field (BF) imaging of specimens. In other words, the imaging tool may include at least one detection channel that is configured to detect light specularly reflected from the specimen. Therefore, the imaging took described herein may be configured for only DF, only BF, or both DF and BF imaging. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCD), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging tool may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate image signals or image data. Therefore, the imaging tool may be configured to generate the images described herein in a number of ways.

It is noted that FIG. 1 is provided herein to generally illustrate a configuration of an imaging tool that may be included in the system embodiments described herein or that may generate images that are used by the system embodiments described herein. Obviously, the imaging tool configuration described herein may be altered to optimize the performance of the imaging tool as is normally performed when designing a commercial imaging tool. In addition, the systems described herein may be implemented using an existing tool (e.g., by adding functionality described herein to an existing tool) such as the 29xx/39xx and Puma 9xxx series of tools that are commercially available from KLA-Tencor, Milpitas, Calif. For some such systems, the embodiments described herein may be provided as optional functionality of the tool (e.g., in addition to other functionality of the tool). Alternatively, the imaging tool described herein may be designed "from scratch" to provide a completely new imaging tool.

Computer subsystem 36 of the imaging tool may be coupled to the detectors of the imaging tool in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions described further herein using the output of the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Figure 2:
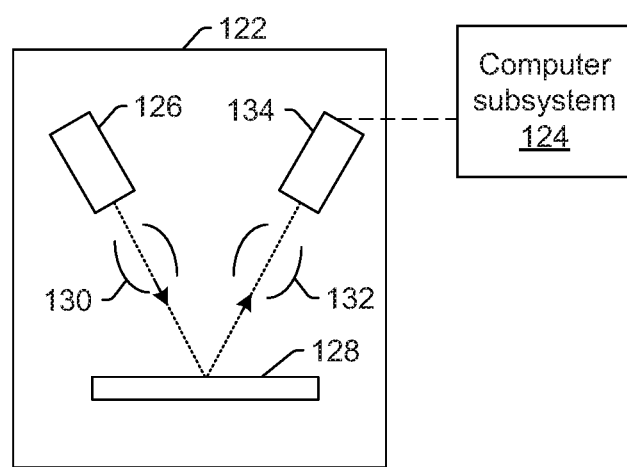

Although the imaging tool is described above as being an optical or light-based imaging tool, in some embodiments, the imaging tool may be configured as an electron beam based imaging tool. In this manner, in some embodiments, the images are generated by an electron beam based imaging tool. In one such embodiment shown in FIG. 2, the imaging tool includes electron column 122 coupled to computer subsystem 124. As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al. U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam based imaging tool may be configured to use multiple modes to generate images of the specimen as described further herein (e.g., with different illumination angles, collection angles, etc.). The multiple modes of the electron beam based imaging tool may be different in any image generation parameters of the imaging tool.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the imaging tool shown in FIG. 2 may be further configured as described herein.

It is noted that FIG. 2 is provided herein to generally illustrate a configuration of an electron beam based imaging tool that may be included in the embodiments described herein. As with the optical based imaging tool described above, the electron beam based imaging tool configuration described herein may be altered to optimize the performance of the imaging tool as is normally performed when designing a commercial imaging tool. In addition, the systems described herein may be implemented using an existing tool (e.g., by adding functionality described herein to an existing tool) such as the eSxxx and eDR-xxxx series of tools that are commercially available from KLA-Tencor. For some such systems, the embodiments described herein may be provided as optional functionality of the tool (e.g., in addition to other functionality of the tool). Alternatively, the tool described herein may be designed "from scratch" to provide a completely new tool.

Although the imaging tool is described above as being an optical based or electron beam based imaging tool, the imaging tool may be an ion beam based imaging tool. Such an imaging tool may be configured as shown in FIG. 2 except that the electron beam source may be replaced with any suitable ion beam source known in the art. In addition, the imaging tool may be any other suitable ion beam based imaging tool such as those included in commercially available focused ion beam (FIB) systems, helium ion microscopy (HIM) systems, and secondary ion mass spectroscopy (SIMS) systems.

As noted above, the imaging tool is configured for scanning energy (e.g., light or electrons) over a physical version of the specimen thereby generating actual images for the physical version of the specimen. In this manner, the imaging tool may be configured as an "actual" tool, rather than a "virtual" tool. For example, a storage medium (not shown) and computer subsystem(s) 102 shown in FIG. 1 may be configured as a "virtual" tool. In particular, the storage medium and the computer subsystem(s) are not part of imaging tool 10 and do not have any capability for handling the physical version of the specimen. In other words, in tools configured as virtual tools, the output of its one or more "detectors" may be output that was previously generated by one or more detectors of an actual tool and that is stored in the virtual tool, and during the "scanning," the virtual tool may replay the stored output as though the specimen is being scanned. In this manner, scanning the specimen with a virtual tool may appear to be the same as though a physical specimen is being scanned with an actual tool. While, in reality, the "scanning" involves simply replaying output for the specimen in the same manner as the specimen may be scanned. Systems and methods configured as "virtual" inspection tools are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents. In addition, configuring the one or more virtual systems as a central compute and storage (CCS) system may be performed as described in the above-referenced patent to Duffy. The persistent storage mechanisms described herein can have distributed computing and storage such as the CCS architecture, but the embodiments described herein are not limited to that architecture.

As further noted above, the imaging tool may be configured to generate images of the specimen with multiple modes. In general, a "mode" can be defined by the values of parameters of the imaging tool used for generating images of a specimen or the output used to generate images of the specimen. Therefore, modes that are different may be different in the values for at least one of the imaging parameters of the imaging tool. For example, in one embodiment of an optical based imaging tool, at least one of the multiple modes uses at least one wavelength of light for illumination that is different from at least one wavelength of the light for illumination used for at least one other of the multiple modes. The modes may be different in the illumination wavelength as described further herein (e.g., by using different light sources, different spectral filters, etc.) for different modes. In another embodiment, at least one of the multiple modes uses an illumination channel of the imaging tool that is different from an illumination channel of the imaging tool used for at least one other of the multiple modes. For example, as noted above, the imaging tool may include more than one illumination channel. As such, different illumination channels may be used for different modes.

In one embodiment, the imaging tool is configured as an inspection tool. For example, the optical and electron beam imaging tools described herein may be configured as inspection tools. In this manner, the image inputs to the deep learning model described herein are generated by an inspection tool in some embodiments. In another embodiment, the imaging tool is configured as a metrology tool. For example, the optical and electron beam imaging tools described herein may be configured as metrology tools. In particular, the embodiments of the imaging tools described herein and shown in FIGS. 1 and 2 may be modified in one or more parameters to provide different imaging capability depending on the application for which they will be used. In one such example, the imaging tool shown in FIG. 1 may be configured to have a higher resolution if it is to be used for metrology rather than for inspection. In other words, the embodiments of the imaging tool shown in FIGS. 1 and 2 describe some general and various configurations for an imaging tool that can be tailored in a number of manners that will be obvious to one skilled in the art to produce imaging tools having different imaging capabilities that are more or less suitable for different applications.

The one or more computer subsystems may be configured for acquiring the images for the specimen generated by an imaging tool described herein. Acquiring the images may be performed using one of the imaging tools described herein (e.g., by directing light or an electron beam to the specimen and detecting light or an electron beam, respectively, from the specimen). In this manner, acquiring the images may be performed using the physical specimen itself and some sort of imaging hardware. However, acquiring the images does not necessarily include imaging the specimen using imaging hardware. For example, another system and/or method may generate the images and may store the generated images in one or more storage media such as a virtual inspection system as described herein or another storage media described herein. Therefore, acquiring the images may include acquiring the images from the storage media in which they have been stored.

The component(s), e.g., component(s) 100 shown in FIG. 1, executed by the computer subsystem(s), e.g., computer subsystem 36 and/or computer subsystem(s) 102, include deep learning model 104. The deep learning model is configured for determining information from an image generated for a specimen by an imaging tool. Deep learning model 104 may have one of the configurations described further herein.

Generally speaking, "deep learning" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

In another embodiment, the deep learning model is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data—such algorithms overcome following strictly static program instructions by making data driven predictions or decisions, through building a model from sample inputs.

The machine learning described herein may be further performed as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)," Hand et al., MIT Press, 2001, 578 pages; which are incorporated by reference as if fully set forth herein. The embodiments described herein may be further configured as described in these references.

In some embodiments, the deep learning model is a generative model. A "generative" model can be generally defined as a model that is probabilistic in nature. In other words, a "generative" model is not one that performs forward simulation or rule-based approaches. Instead, as described further herein, the generative model can be learned (in that its parameters can be learned) based on a suitable training set of data. In one embodiment, the deep learning model is configured as a deep generative model. For example, the model may be configured to have a deep learning architecture in that the model may include multiple layers, which perform a number of algorithms or transformations.

In another embodiment, the deep learning model is configured as a neural network. In a further embodiment, the deep learning model may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the information includes a classification for a defect detected on the specimen. In one such embodiment, the deep learning model is configured as an AlexNet. For example, an AlexNet includes a number of convolutional layers (e.g., 5) followed by a number of fully connected layers (e.g., 3) that are, in combination, configured and trained to classify images. Examples of neural networks configured as AlexNets are described in "ImageNet Classification with Deep Convolutional Neural Networks" by Krizhevsky et al., NIPS 2012, which is incorporated by reference as if fully set forth herein. The deep learning models described herein may be further configured as described in this reference.

In another such embodiment, the deep learning model is configured as a GoogleNet. For example, a GoogleNet may include layers such as convolutional, pooling, and fully connected layers such as those described further herein configured and trained to classify images. While the GoogleNet architecture may include a relatively high number of layers (especially compared to some other neural networks described herein), some of the layers may be operating in parallel, and groups of layers that function in parallel with each other are generally referred to as inception modules. Other of the layers may operate sequentially. Therefore, GoogleNets are different from other neural networks described herein in that not all of the layers are arranged in a sequential structure. Examples of neural networks configured as GoogleNets are described in "Going Deeper with Convolutions," by Szegedy et al., CVPR 2015, which is incorporated by reference as if fully set forth herein. The deep learning models described herein may be further configured as described in this reference.

In a further such embodiment, the deep learning model is configured as a VGG network. For example, VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to classify images. VGG networks also include convolutional layers followed by fully connected layers. Examples of neural networks configured as VGG are described in "Very Deep Convolutional Networks for Large-Scale Image Recognition," by Simonyan et al., ICLR 2015, which is incorporated by reference as if fully set forth herein. The deep learning models described herein may be further configured as described in this reference.

In some such embodiments, the deep learning model is configured as a deep residual network. For example, like some other networks described herein, a deep residual network may include convolutional layers followed by fully connected layers, which are, in combination, configured and trained for image classification. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart. Examples of deep residual nets are described in "Deep Residual Learning for Image Recognition" by He et al., NIPS 2015, which is incorporated by reference as if fully set forth herein. The deep learning models described herein may be further configured as described in this reference.

In a further such embodiment, the deep learning model includes one or more fully connected layers configured for classifying defects on the specimen. A "fully connected layer" may be generally defined as a layer in which each of the nodes is connected to each of the nodes in the previous layer. The fully connected layer(s) may perform classification based on the features extracted by convolutional layer(s), which may be configured as described further herein. The fully connected layer (s) are configured for feature selection and classification. In other words, the fully connected layer(s) select features from a feature map and then classify the defects in the image(s) based on the selected features. The selected features may include all of the features in the feature map (if appropriate) or only some of the features in the feature map.

If the deep learning model outputs a classification for a defect detected on the specimen, the deep learning model may output an image classification, which may include a classification result per image with a confidence associated with each classification result. The results of the image classification can also be used as described further herein. The image classification may have any suitable format (such as an image or defect ID, a defect description such as "pattern," "bridge," etc.). The image classification results may be stored and used as described further herein.

In some embodiments, the information determined by the deep learning model includes features of the images extracted by the deep learning model. In one such embodiment, the deep learning model includes one or more convolutional layers. The convolutional layer(s) may have any suitable configuration known in the art and are generally configured to determine features for an image as a function of position across the image (i.e., a feature map) by applying a convolution function to the input image using one or more filters. In this manner, the deep learning model (or at least a part of the deep learning model) may be configured as a convolution neural network (CNN). For example, the deep learning model may be configured as a CNN, which is usually stacks of convolution and pooling layers, to extract local features. The embodiments described herein can take advantage of deep learning concepts such as a CNN to solve the normally intractable representation inversion problem. The deep learning model may have any CNN configuration or architecture known in the art. The one or more pooling layers may also have any suitable configuration known in the art (e.g., max pooling layers) and are generally configured for reducing the dimensionality of the feature map generated by the one or more convolutional layers while retaining the most important features.

The features determined the deep learning model may include any suitable features described further herein or known in the art that can be inferred from the input described herein (and possibly used to generate the output described further herein). For example, the features may include a vector of intensity values per pixel. The features may also include any other types of features described herein, e.g., vectors of scalar values, vectors of independent distributions, joint distributions, or any other suitable feature types known in the art.

In a further embodiment, the information includes a simulated image generated from the image. The deep learning model may be configured to generate a simulated image as described in U.S. Patent Application Publication Nos. 2017/0148226 published May 25, 2017 by Zhang et al., 2017/0193680 published Jul. 6, 2017 by Zhang et al., 2017/0194126 published Jul. 6, 2017 by Bhaskar et al., 2017/0200260 published Jul. 13, 2017 by Bhaskar et al., and 2017/0200265 published Jul. 13, 2017 by Bhaskar et al., and U.S. patent application Ser. No. 15/603,249 filed May 23, 2017 by Zhang et al., which are incorporated by reference as if fully set forth herein. The embodiments described herein may be further configured as described in these publications and applications.

In another embodiment, the information determined by the deep learning model includes one or more segmentation regions generated from the image. In one such embodiment, the deep learning model includes a proposal network configured for identifying the segmentation region(s) (based on features determined for the image) and generating bounding boxes for each of the segmentation regions. The segmentation regions may be detected based on the features (determined for the images by the deep learning model or another method or system) to thereby separate regions in the images based on noise (e.g., to separate noisy regions from quiet regions), to separate regions in the images based on specimen features located therein, to separate regions based on geometric characteristics of the output, etc. The proposal network may use features from a feature map, which may be generated or determined as described further herein, to detect the segmentation region(s) in the image based on the determined features. The proposal network may be configured to generate bounding box detection results. In this manner, the deep learning model may output bounding boxes, which may include a bounding box associated with each segmentation region or more than one segmentation region. The deep learning model may output bounding box locations with each bounding box. The results of the segmentation region generation can also be stored and used as described further herein.

A proposal network or a "region proposal network" can be generally defined as a fully convolutional network that detects objects in images and proposes regions corresponding to those detected objects. Examples of proposal networks are described in "Faster R-CNN: Towards Real-Time Object Detection with Region Proposal Networks" by Ren et al., NIPS, 2015, which is incorporated by reference as if fully set forth herein. The proposal network described herein may be further configured as described in this reference. Proposal networks may be attractive for use in the embodiments described herein because they are relatively fast and are able to detect objects of different size. The proposal network may overlay a sliding window on a feature map generated by a convolution layer(s) thereby generating k anchor boxes. The results of overlaying the sliding window on a feature map may be input to an intermediate layer of the proposal network, which may generate 2 k scores via a cls layer and 4 k coordinates via a reg layer.

In another embodiment, the information includes a multi-dimensional output generated from the image. For example, as described further herein, the information generated by the deep learning model may include one or more properties such as a one-dimensional vector, detect types, or a multiple dimensional output such as a two-dimensional image-like output, e.g., a simulated image, segmentation region(s), etc., or an n-dimensional output.

In general, the deep learning model described herein is a trained deep learning model. For example, the deep learning model for which one or more diagnostic functions are performed may be previously trained by one or more other systems and/or methods. In addition, the deep learning model may be trained by one or more of the embodiments described herein before the one or more diagnostic functions are performed for the deep learning model. In this manner, the diagnostic functions described herein are unlike deep learning model characterizations that are performed during training of a deep learning model in that in the embodiments described herein, the deep learning model is already generated and trained and then the functionality of the model is determined as described herein, which can then be used to perform one or more additional functions for the deep learning model.

The one or more components include a diagnostic component, e.g., diagnostic component 106 shown in FIG. 1, configured for determining one or more causal portions of the image that resulted in the information being determined. In this manner, the embodiments described herein provide a causal understanding of how the deep learning model generated the information for a particular input or image. In addition, the embodiments described herein provide a causal understanding and assurance of a deep learning model. The following provides a formal definition of causal understanding and causal portions as those terms are used herein.

An input to a deep learning model can include a combination of: a) images defined by $x(h, w, c, t, \ldots)$, which is an N-dimensional tensor of images with height=h and width=w across other dimensions, e.g., channel c, time t, etc. (In semiconductor applications, x can be an optical image, an electron beam image, a design data image (e.g., CAD image), etc. under different tool conditions); and b) feature vector $v(m)$, which is a 1-dimensional vector (The dimension can be generalized to be more than 1).

A deep learning model can be defined as a trainable function of $F(y|x, v; w)$, i.e., given inputs of x and v and model parameters of w, F predicts the property of y. The predicted output y can be one or more properties as a 1-dimensional vector, e.g., defect types. The predicted output y can also be 2-dimensional, image-like output, e.g., a simulated image, segmentation region, etc. In addition, the predicted output y can be an n-dimensional output. Given a trained model, i.e., parameters of w are learned as W, the model response with respect to the input change from (x, v) to (x', v') is defined as $R=p\ F(x', v'; w=W)-F(x, v; w=W)$.

In general, the inputs of x and v have relatively high dimensions. For example, given an input image having a width of 128 pixels and a height of 128 pixels, the dimensions are 128×128. Given an observed response, not every dimension (i.e., pixel) is equally contributing to the response (e.g., in defect detection applications, the defective pixels tend to be more important than background pixels, and the neighboring pixels may or may not be important depending on circuit design and process condition).

Generating a causal understanding of a deep learning model as described herein refers to qualitatively and quantitatively identifying the importance of each input pixel and each input feature subject to an observed response. Formally, the importance score of x is called a "causal image," and the importance score of v as a "causal vector." In the causal image and causal vector, a positive value means this pixel/feature positively contributes to the response (i.e., the higher the value, the higher the response); a near-zero value means the pixel/feature is irrelevant to the response; and a negative value means the pixel/feature has a negative contribution to the response. Therefore, the regions with positive, near-zero, and negative values are called positive, irrelevant, and negative regions, respectively. The term "causal portions" as used herein refers to any and all of the causal understanding information described above. For example, the causal portions can be defined by both the causal image and the causal vector. In this manner, causal portions may include portion(s) of an image that positively contribute to the response (or information determined by the deep learning model), portion(s) of the image that are largely irrelevant to the response, portion(s) of the image that have a negative contribution to the response, or some combination thereof.

Given a trained deep learning model F(y|x, v; w=W) and a particular input or data (x, v), the system runs the deep learning model in the forward direction to generate the prediction y and/or related outputs. The related outputs are application-specific, e.g., for a classification task, the related outputs can be the top-N classification results. The response of the model from predefined (x0, v0) to (x, v) can be constructed and computed. The "causal image" and/or causal vector is/are computed using one or more methods and/or algorithms described further herein. The choice of (x0, v0) is based on application and algorithm.

In a further embodiment, the diagnostic component is configured for determining the one or more causal portions by computing a local sensitivity. For example, as described by Simonyan et al., "Deep inside convolutional networks: Visualizing image classification models and saliency maps," ICLR Workshop, 2014, which is incorporated by reference as if fully set, forth herein, the causal image can be computed as the local sensitivity, $$\left\|\frac{\partial}{\partial x}F(x, v; w)\right\|_\infty \text{ or }$$

$$\left\|\frac{\partial}{\partial v}F(x, v; w)\right\|_\infty.$$

The embodiments described herein may be further configured as described in the above-reference.

In another embodiment, the diagnostic component is configured for determining the one or more causal portions by causal back propagation. For example, the diagnostic component may perform a top-down backpropagation of the deep learning model. In the backpropagation process at each layer, there are three inputs that are available: (1) activation value from previous layer; (2) trained parameters for this layer; and (3) causal values backpropagated from the next layer. In general, a causal backpropagation function can be designed for each layer type including, but not limited to, convolutional layer, fully-connected layer, various activation layer, various pooling layers, etc. to assign pixel-wise causal scores in the input space (i.e., dimension) based on the layer computation and the three inputs mentioned above. The causal backpropagation can be started at the highest layer (i.e., the output layer of a network) or any intermediate layer given the causal values can be initialized in a way. When the causal backpropagation is backpropagated to the lowest layer (i.e., the input layer to a network), the causal weights form the causal image in the image space. The region highlighted in the causal image is the region that causes the deep learning model to make its decision (i.e., determine the information that it did).

In some embodiments, the diagnostic component is configured for determining the one or more causal portions by causal back propagation performed using a deconvolution heatmap algorithm. A deconvolution heatmap can be viewed as a specific implementation of causal backpropagation. For example, as described by Zeiler et al., "Visualizing and understanding convolutional networks," ECCV, 2014, pp. 818-833, which is incorporated by reference as if fully set forth herein, the causal image can be computed via mapping activation from the deep learning model's output back to the pixel/feature (i.e., x and v) space through a backpropagation rule. The embodiments described herein may be further configured as described in this reference.

In still another embodiment, the diagnostic component is configured for determining the one or more causal portions by causal back propagation performed using a layer-wise relevance propagation. A layer-wise relevance propagation can also be viewed as a specific implementation of causal backpropagation. For example, as described by Samek et al., in "Evaluating the visualization of what a Deep Neural Network has learned," arXiv: 1509:06321, which is incorporated by reference as if fully set forth herein, the causal image/vector can be computed via back-propagating the relevance under the conservation rule. The embodiments described herein may be further configured as described in this reference.

In an additional embodiment, the diagnostic component is configured for determining the one or more causal portions by causal back propagation performed using a deep lift algorithm. A deep lift algorithm can also be considered a specific implementation of causal backpropagation. For example, as described by Shrikumar et al., in "Not Just A Black Box: Learning Important Features through propagating activation differences," arXiv: 1605.01713, which is incorporated by reference as if fully set forth herein, the causal image/vector can be computed via back-propagating the activation difference of a deep learning model. The embodiments described herein may be further configured as described in this reference.

In a further embodiment, the diagnostic component is configured for determining the one or more causal portions by global average pooling. As described by Lin et al, in "Network In Network," arXiv: 1312.4400, which is incorporated by reference as if fully set forth herein, the global average pooling (GAP) is introduced and defined. GAP provides crude pixel-level causal region information, which can be approximately interpreted as causal image/vector. The embodiments described herein may be further configured as described in the above reference.

In some additional embodiments, the diagnostic component is configured for determining the one or more causal portions by computing a path integral on gradients. Similar to Sundararajan et al. in "Axiomatic Attribution for Deep Networks," arXiv: 1703.01365, which is incorporated by reference as if fully set forth herein, the causal image can be computed as the path integral on gradients, $$\int_t \frac{\partial F(x, v; w)}{\partial x} \cdot \frac{\partial x}{t} dt$$

where t is a path from (x, v) to (x', v') as discussed further herein. The embodiments described herein may be further configured as described in this reference.

In another embodiment, the diagnostic component is configured for determining the one or more causal portions by computing a partial dependence plot. Partial dependence plot (PDP) is introduced by Friedman in "Greedy Function Approximation: A Gradient Boosting Machine," The Annals of Statistics, 29(5): 1189-1232, which is incorporated by reference as if fully set forth herein. Causal image can be computed as $$\int F(x,v;w)dP(x).$$

The embodiments described herein may be further configured as described in this reference.

In an additional embodiment, the diagnostic component is configured for determining the one or more causal portions by computing a partial dependence plot with path integral. As the P(x) (or P(v)) is defined on a higher dimension, the integral above can be intractable in practice, we can combine the PDP with Path Integral (PDPPI) by defining the P(x) as the probability distribution of x along a path from x to x'. And the formula for PDPPI is:

$$\int_t F(x, v; w)dP(x(t)).$$

Similarly, PDPPI can also be defined on gradients:

$$\int_t \frac{\partial F(x, v; w)}{\partial x} dP(x(t)).$$

The diagnostic component is also configured for performing one or more functions based on the determined one or more causal portions of the image. The one or more functions may include any of the functions described further herein.

In some embodiments, the one or more functions include altering one or more parameters of the deep learning model based on the determined one or more causal portions. For example, the diagnostic component may determine if the one or more causal portions are the correct causal portion(s) of the image, which may be performed as described further herein. If the one or more causal portions are incorrect, the diagnostic component may be configured to fine-tune or re-train the deep learning model to thereby alter one or more parameters of the deep learning model, which may include any of the parameters described herein. The fine-tuning or re-training of the deep learning model may include inputting additional training images to the deep learning model, comparing the output generated for the training images to known output for the training images (e.g., defect classification(s), segmentation region(s), etc.), and altering one or more parameters of the deep learning model until the output generated for the additional training images by the deep learning model substantially matches the known output for the additional training images. In addition, the diagnostic component may be configured to perform any other method and/or algorithm to alter one or more parameters of the deep learning model based on the determined one or more causal portions.

In one embodiment, the one or more functions include determining if the one or more causal portions that resulted in the information being determined are the correct one or more causal portions of the image. For example, as described further herein, the correct one or more causal portions of the image may be identified by a user or users, and then the correct one or more causal portions can be compared to the determined one or more causal portions to determine if the correct and determined causal portions match and/or to determine differences between the correct and determined causal portions. The correct causal portion(s) of the image may also be acquired from another method or system rather than from a user. For example, by inputting the image to a different deep learning model having known acceptable functionality, the diagnostic component described herein can be configured or used to determine the causal portion(s) of the image that resulted in the information being determined by the different deep learning model. Given the known acceptable functionality of the different deep learning model, those one or more causal portions can be assumed to be the correct one or more causal portions, which can then be compared to the one or more causal portions determined by the diagnostic component for the deep learning model to determine if the deep learning model identified the correct one or more causal portions of the image.

In another embodiment, the one or more components include a visualization component configured for displaying at least the image, the determined information, and the determined one or more causal portions to a user. For example, the displayed information/data provided to a user by the visualization component may include, but is not limited to, the input data (x, v), prediction y and related outputs, causal image and/or causal vector, i.e., the causal portion(s), ground truth (if any), and other related data and/or meta data. The visualization component may be deployed with a trained deep learning model on a system such as those described further herein. The visualization component may also be deployed with any suitable graphical user interface (GUI) known in the art. The visualization component may be disabled in normal runtime mode and enabled in the diagnostic mode. When the visualization component is enabled, the causal images are generated and displayed for selected input data. The causal images may be checked by one or more users such as domain experts or crowd sourcing or comparison algorithms and/or methods against region labels (if available). In this manner, the embodiments described herein provide a way for visualizing the causal of the prediction on a particular input by a deep learning model.

Figure 3:
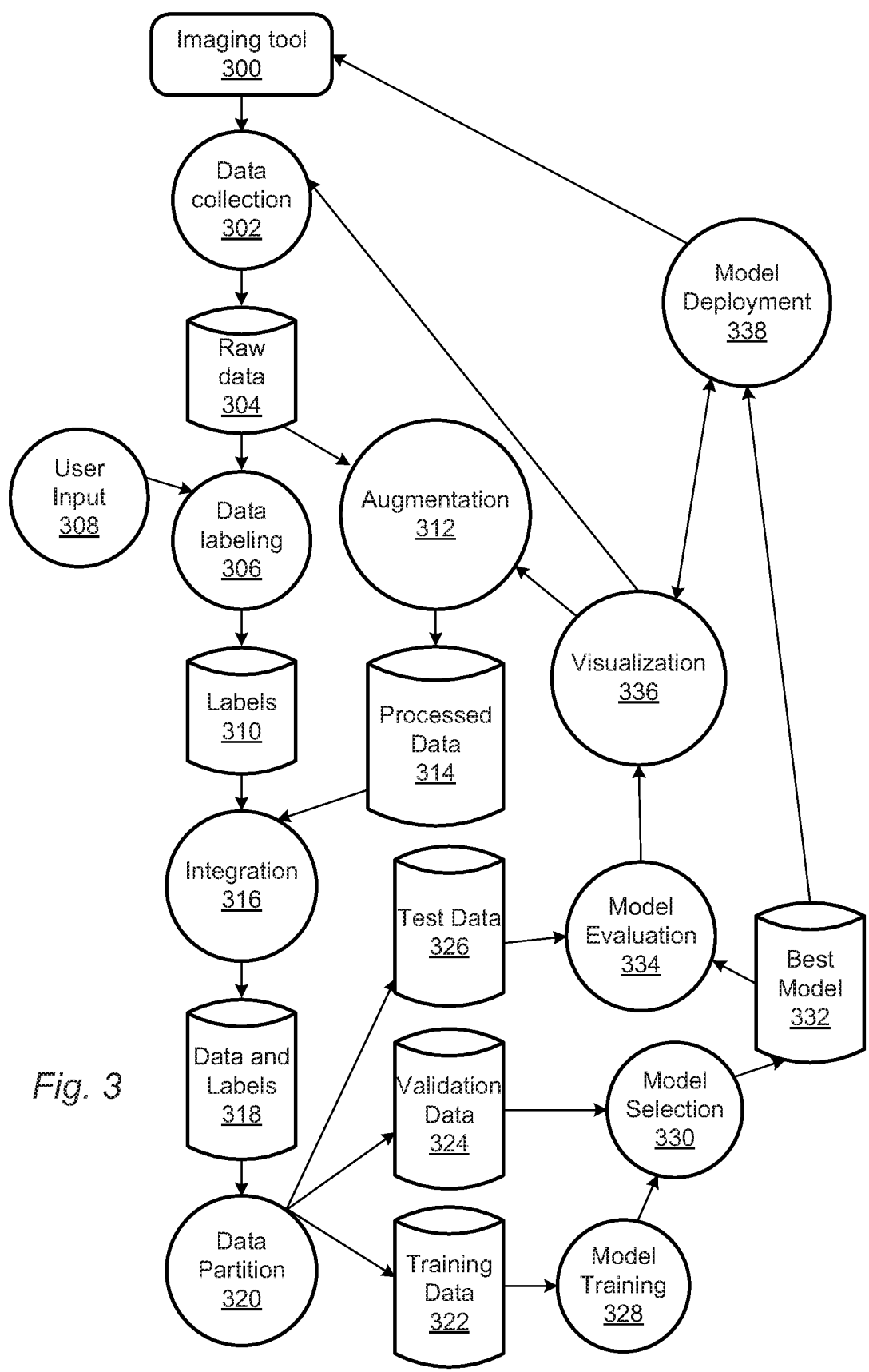
FIGS. 3 and 4 are flow charts illustrating embodiments of steps that may be performed by systems described herein for performing diagnostic functions for a deep learning model.

FIG. 3 illustrates one or more steps that can be performed by the embodiments described herein. FIG. 3 also illustrates steps that may be performed to develop or create a deep learning model, which may be performed by the embodiments described herein or by another system or method, in addition to one or more steps described further herein. The deep learning model development workflow may include data collection 302 from imaging tool 300, which may include any of the imaging tools described herein. The data that is collected may include output described further herein (e.g., images, image data, etc.) of any of the imaging tools described herein. The data that is collected may be for one or more specimens that may or may not be of the same type (e.g., multiple specimens of the same type or multiple specimens at least one of which is of a type different from the others). Data collection 302 may therefore produce raw data 304.

The deep learning model development workflow may also include data labeling 306 and optional data augmentation 312. The data labeling may be performed based on user input 308 such as input from a crowd or one or more experts. The data labeling may be performed in any suitable manner and the labels may be any suitable labels known in the art. Data labeling 308 may produce labels 310. Data augmentation may be performed as described further herein and may generate processed data 314. The labels and the processed data may then be integrated in integration 316, which may be performed in any suitable manner, thereby generating data and labels 318.

The deep learning model development workflow may also include data partition 320, in which data and labels 318 is separated into training data 322, validation data 324, and test data 326. Data partitioning may be performed in any suitable manner. For example, the data and labels may be simply divided into three different equal portions such that some data (and its corresponding labels) is available and used for training, some other data (and its corresponding labels) is used for validation, and still other data (and its corresponding labels) is used for testing.

Training data 322 may be input to model training 328, which may be performed in any suitable manner. For example, the model training may include inputting the training data to the deep learning model and modifying one or more parameters of the model until the output of the model is the same as (or substantially the same as) the labels assigned to the data. Model training 328 may generate one or more trained models, which may then be sent to model selection 330, which is performed using validation data 324. The results that are produced by each one or more trained models for the validation data that is input to the one or more trained models may be compared to the labels assigned to the validation data to determine which of the models is the best model, e.g., best model 332. For example, the model that produces results that most closely match the validation data labels may be selected as the best model. Test data 326 may then be used for model evaluation 334 of best model 332. Model evaluation may be performed in any suitable manner. For example, the test data may be input to the best model and the results produced by the best model for the test data may be compared to the labels for the test data to determine how closely the results produced by the best model match the labels. Best model 332 may also be sent, to model deployment 338 in which the best model may be sent to imaging tool 300 for use in a production or runtime mode (post-training mode). The best model may then be applied to additional images, data, output, etc. generated by the imaging tool.

The model evaluation results may also be sent to visualization 336, which may be performed by one or more of the systems described herein and may include determining one or more causal portions of the image that resulted in the information being determined and for performing one or more functions based on the determined one or more causal portions of the image. In other words, the "visualization" shown in FIG. 3 may essentially be any of the functionality described herein of the diagnostic component. In some instances, the information determined from an image generated for a specimen by a deep learning model may be provided to the diagnostic component or visualization 336 via model deployment 338. However, the information determined from an image generated for a specimen by a deep learning model may be provided to the diagnostic component or visualization 336 via model evaluation 334.

In one such embodiment, the one or more components include a user interface component configured to receive input from the user after the displaying, and the one or more functions performed by the diagnostic component are determined based on the input from the user. For example, the embodiments described herein allow a user to reinforce the correct causal relationship to be learned by a deep learning model. In one particular example, as described further herein, one or more users may provide input to the embodiments described herein regarding the correct causal portion(s) of the image input. The correct causal portion(s) received from the user may then be used to perform one or more other functions described herein. The user interface component may have any suitable configuration known in the art that can be used to receive the input from the user.

In a further embodiment, the one or more functions include determining one or more characteristics of the one or more causal portions and determining, based on the one or more characteristics of the one or more causal portions, if additional images for the specimen should be collected from the imaging tool and used for additional training of the deep learning model. For example, the diagnostic component or visualization 336 may be added after model evaluation as shown in FIG. 3 and it may fall back to data collection 302, if causal assurance failed on a) considerable samples of one type or class; and/or b) considerable samples of several types or classes. If this path is selected, extra data for the error types or classes are collected from imaging tool 300 for further training. For example, as shown in FIG. 3, visualization 336 may send output such as instructions for additional data collection to data collection 302 step, which may be performed using imaging tool 300. The additional data collection may be performed using the same specimens that were used for initial data collection and/or different specimens not previously used for data collection.

The additional data collection may or may not be performed with the same imaging parameters as the original data collection. For example, it may be advantageous to try to collect different or better data with different imaging parameters that are more suitable for generating input data for the deep learning model. In this manner, the embodiments described herein may also provide an iterative feedback loop in which models are trained and evaluated, and if a suitable model cannot be generated and trained, then different imaging data may be generated with different imaging parameters until suitable images or data have been generated that resulted in a suitably trained model being developed and trained. The fall back path involving additional data collection also allows a domain expert and/or other user(s) to reinforce and to fine tune a deep learning model to learn the correct causal relationship at a finer granularity.

In another embodiment, the one or more functions include determining one or more characteristics of the one or more causal portions and altering the image based on the one or more characteristics of the one or more causal portions to thereby generate an augmented image for input to the deep learning model. For example, the embodiments may augment the input image based on guidance generated by the system from the one or more characteristics. Altering the image based on the one or more characteristics of the causal portion(s, to thereby generate an augmented image may be performed as described further herein.

In an additional embodiment, the one or more functions include determining one or more characteristics of the one or more causal portions and generating a data augmentation method for application to additional images input to the deep learning model. For example, the embodiments may generate one or more parameters of a new data augmentation method and/or alter one or more parameters of an existing data augmentation method based on guidance generated by the system from the one or more characteristics to thereby generate a data augmentation method. The data augmentation method can be applied to the images that were input to the deep learning model for which the causal portion(s) were determined and/or to images that have not yet but will be input to the deep learning model.

In the embodiments described above, the diagnostic component or visualization 336 may be added after model evaluation as shown in FIG. 3 and it may fail back to data augmentation 312, if causal assurance failed on a) a few samples of one type or class; b) ambiguously-labeled samples; c) samples belonging to multiple types or classes; or some combination thereof if this path is selected, the causal image (from visualization 336 or the diagnostic component) and the labeled causal region or portion (e.g., from domain expert or crowd sourcing) are compared to generate a data augmentation method. The data augmentation method may include applying a mask, function, filter, algorithm, etc. to the data or images generated by the imaging tool. The mask, function, filter, algorithm, etc. may have any suitable type or format such as random, fuzzy, or noisy. The data augmentation method may advantageously enhance the causal portion(s) of the images or data (or the positively contributing portions of the input images or data) and/or de-emphasize the non-causal portion(s) of the images or data (or the largely irrelevant and/or negatively contributing portion(s) of the images or data).

In one such example, the causal information may be generated for an input image and if the relevant region in the causal information matches the defect to be detected (in the case of defect detection or classification), the diagnostic component may determine that no augmentation needs to be performed as the model predicted correctly. However, if the relevant region only matches part of a defect or does not match a defect at all (in the case of defect detection or classification), the diagnostic component may determine that an augmentation method may be advantageous and may request input from a user for a possible augmentation method. The user may then, for example, specify one or more attention portions and/or one or more ignore regions in the input image via bounding boxes, locations, etc. The information for these user-specified portions can be sent to the augmentation step to alter the input image, for example, by randomly perturbing the ignore portion(s) by zeroing or adding noise and/or randomly transforming the attention portion(s).

The data augmentation method may then be applied to corresponding input data to thereby generate new augmented data. For example, as shown in FIG. 3, visualization 336 may send the new data augmentation method to data augmentation 312 step, which may be applied to raw data 304. The fall back path involving data augmentation allows a domain expert and/or other user(s) to reinforce and to fine tune a deep learning model to learn the correct causal relationship at a finer granularity.

Data augmentation 312 may, therefore, be performed differently depending on when it is performed and which information it is performed based on. For example, in a first run (or in runs performed prior to having the information for the causal portion(s)), the augmentation is optional and may only involve performing physical transformation(s) such as translation, rotation, mirroring, etc. However, in later run(s), when the causal information (e.g., causal map/causal vector) and possibly user input is/are available, the augmentation may be performed using the causal information determined by the diagnostic component and (optional) user input to generate augmented data.

The visualization step that is performed after model evaluation may also fall back to model deployment if causal assurance is passed. In other words, if visualization 336 does not determine that additional data should be collected and/or that a new or altered data augmentation method should be generated and/or tested, then the model may be deployed as a trained model that is used at runtime or in production.

Figure 4:
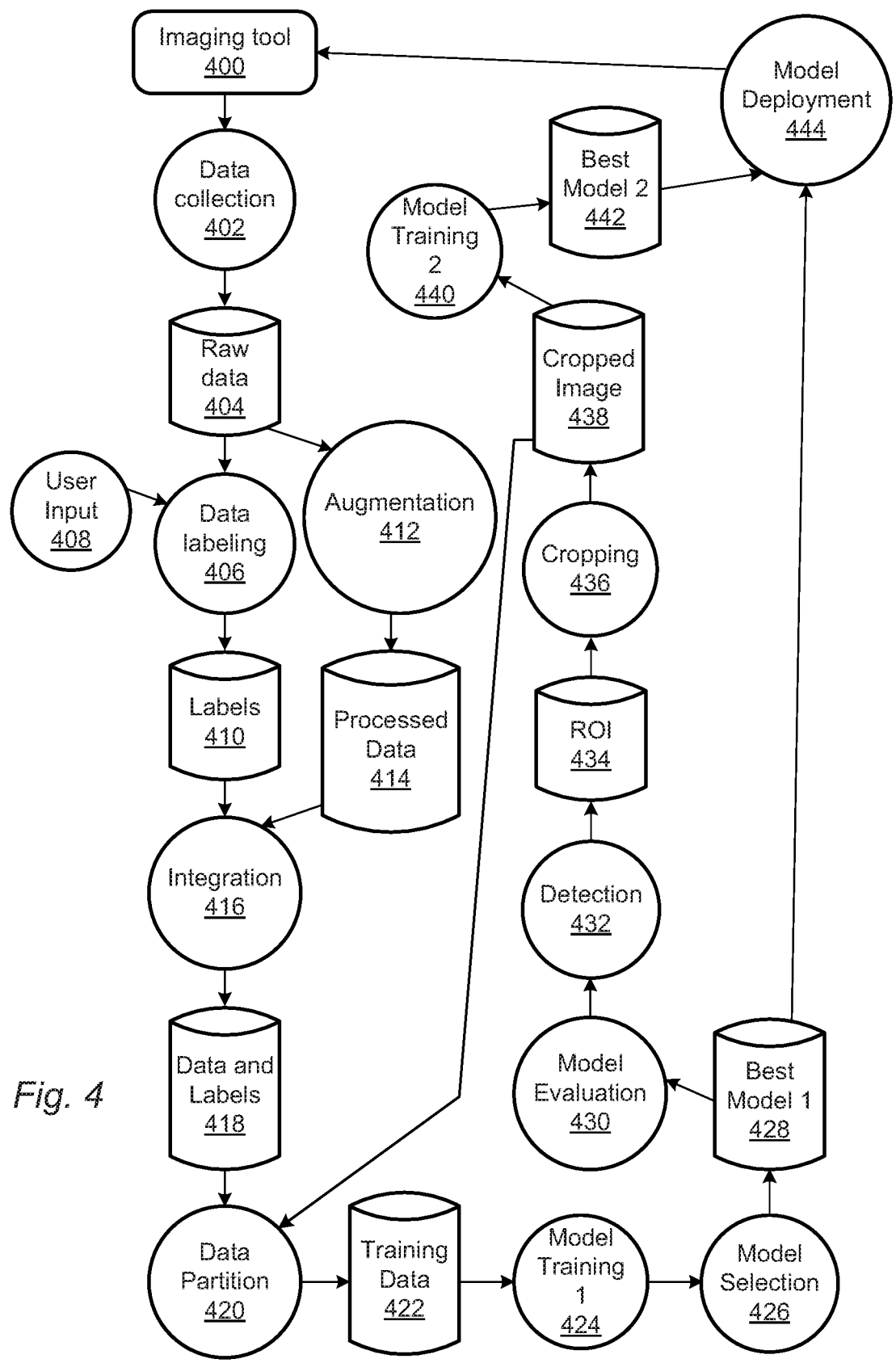

FIG. 4 illustrates one or more steps that can be performed by the embodiments described herein. FIG. 4 also illustrates steps that may be performed to develop or create a deep learning model, which may be performed by the embodiments described herein or by another system or method, in addition to one or more steps described further herein. The deep learning model development workflow may include data collection 402 from imaging tool 400, which may include any of the imaging tools described herein. The data that is collected may include output described further herein (e.g., images, image data, etc.) of any of the imaging tools described herein. The data that is collected may be for one or more specimens that may or may not be of the same type (e.g., multiple specimens of the same type or multiple specimens at least one of which is of a type different from the others). Data collection 402 may therefore produce raw data 404.

The deep learning model development workflow may also include data labeling 406 and optional data augmentation 412. The data labeling may be performed based on user input 408 such as input from a crowd and/or one or more experts. The data labeling may be performed in any suitable manner and the labels may be any suitable labels known in the art. Data labeling 406 may produce labels 410. Data augmentation may be performed as described further herein and may generate processed data 414. The labels and the processed data may then be integrated in integration 416, which may be performed in any suitable manner, thereby generating data and labels 418.

The deep learning model development workflow may also include data partition 420, in which data and labels 418 is separated into training data 422 and any other data (not shown in FIG. 4) described herein. Data partitioning may be performed in any suitable manner. For example, the data and labels may be simply divided into different equal portions such that some data (and its corresponding labels) is available and used for training and other data (and its corresponding labels) is available and used for other purposes.

Training data 422 may be input to model training 1 424, which may be performed in any suitable manner. For example, the model training may include inputting the data to the deep learning model and modifying one or more parameters of the model until the output of the model is the same as (or substantially the same as) the labels assigned to the data. Model training 1 424 may generate one or more trained models, which may then be sent, to model selection 426, which may be performed in any suitable manner. For example, the results that are produced by each one or more trained models may be compared to the labels assigned to validation data to determine which of the models is the best model, e.g., best model 1 428. For example, the model that produces results that most closely match validation data labels may be selected as the best model. Test data may then be used for model evaluation 430 of best model 1 428. Model evaluation may be performed in any suitable manner. For example, test data may be input to best model 1 and the results produced by best model 1 for the test data may be compared to the labels for the test data to determine how closely the results produced by best model 1 match the labels. Best model 1 428 may also be sent to model deployment 444 in which best model 1 may be sent to imaging tool 400 for use in a production or runtime mode (post-training mode). Best model 1 may then be applied to additional images, data, output, etc. generated by the imaging tool.

The model evaluation results may also be sent to detection 432, which may be performed by one or more of the systems described herein and may include determining one or more causal portions of the images that resulted in the information being determined. In a further embodiment, the one or more functions include identifying the one or more causal portions as one or more regions of interest (ROIs) in the image and tuning the deep learning model based on the one or more ROIs. For example, causal back propagation or another of the causal portion determination methods described herein may be used as semi-supervised ROI detection to better tune the original deep learning model. The reason this is called "semi-supervised" is that the labeling process for best model 1 does not require labeling exactly the bounding box for each object. In this manner, the one or more causal portions may be identified and used as semi-supervised region detection information. In other words, the diagnostic component described herein may be used as a detection module after the model evaluation to automatically generate ROI(s). In other words, the causal portion(s) specify the important pixels or higher order features responsible for the output generation (e.g., classification or prediction). Therefore, the causal portion information provides pixel-level location information.

For example, as shown in FIG. 4, detection 432 may generate ROI 434, which may include information for any one or more causal portions identified as ROIs, which may be used for cropping 436 of the original image to the candidate patch along with the output (e.g., class prediction) from best model 1. In particular, the original image may be cropped to eliminate portion(s) of the original image that do not correspond to the ROI(s). In one such example, cropped image(s) 438 generated by cropping 436 may be output to data partition 420, which may then use the cropped images to generate additional training data 422, which may replace the original training data. The new training data may then be used to tune best model 1. For example, the new training data may be input to model training 1 424, which may be used to tune or fine tune parameters of best model 1, which may output results to model selection 426. Model selection may produce best model 1 428, which would be a modified version of the best model 1 originally produced. The new best model 1 may then be evaluated as described above and used for detection of ROI(s), which can be used to generate still further training data, which can be used to re-tune the best model 1 again. In this manner, the embodiments described herein provide a system for iteratively tuning a deep learning model based on ROI(s) determined by previous versions of the deep learning model.

In some embodiments, the one or more functions include identifying the one or more causal portions as one or more ROIs in the image, which may be performed as described herein, and training an additional deep learning model based on the one or more ROIs. For example, causal back propagation or another of the causal portion determination methods described herein may be used as semi-supervised ROI detection to train a second "more accurate" deep learning model based on cropped images. The reason this is called "semi-supervised" is that the labeling process for best model 1 does not require labeling exactly the bounding box for each object. As shown in FIG. 4, for example, cropped image 438 may be provided to model training 2 440. Model training 2 may be performed as described herein, but using a different deep learning model than that trained in model training 1 424. Results of model training 2 may produce best model 2 442, which may then be provided to model deployment 444, which may be performed as described further herein.

As can be seen from the description of the embodiments provided herein, therefore, the embodiments described herein provide a number of new and advantageous features and/or functionality compared to previously used methods for evaluating a deep learning model. For example, the embodiments described herein enable a way to feedback user knowledge to a deep learning model development workflow in a systematic way. In addition, the embodiments described herein enable a way to understand why deep learning models make a prediction via various algorithms.

Furthermore, the embodiments described herein provide diagnostics for a deep learning model. The embodiments described herein further provide causal assurance on a trained deep learning model. Moreover, the embodiments described herein provide user-guided data augmentation and/or semi-supervised region detection and fine-tuning on cropped ROI images.

The computer subsystem(s) described herein may be further configured for single image detection as described in U.S. Patent Application Publication No. 2017/0140524 published May 18, 2017 by Karsenti et al., which is incorporated by reference as if fully set forth herein. The embodiments described herein may be further configured as described in commonly owned U.S. Patent Application Publication Nos. 2017/0140524 published May 18, 2017 by Karsenti et al., 2017/0148226 published May 25, 2017 by Zhang et al., 2017/0193400 published Jul. 6, 2017 by Bhaskar et al., 2017/0193680 published Jul. 6, 2017 by Zhang et al., 2017/0194126 published Jul. 6, 2017 by Bhaskar et al., 2017/0200260 published Jul. 13, 2017 by Bhaskar et al., 2017/0200264 published Jul. 13, 2017 by Park et al., and 2017/0200265 published Jul. 13, 2017 by Bhaskar et al., and U.S. patent application Ser. No. 15/603,249 filed May 23, 2017 by Zhang et al., which are incorporated by reference as if fully set forth herein. The embodiments described herein may also be configured to perform any steps described in these patent application publications and applications.

The one or more computer subsystems may be configured for generating results of one or more steps described herein. The results may include any of the results described herein such as the determined information, the determined causal portion(s), results of the one or more functions, etc. The results may be generated by the computer subsystem(s) in any suitable manner. The results may have any suitable form or format such as a standard file type. The computer subsystem(s) may generate the results and store the results such that the results can be used by the computer subsystem(s) and/or another system or method to perform one or more functions for the deep learning model, the imaging tool, the specimen or another specimen of the same type. Such functions include, but are not limited to, altering a process such as a fabrication process or step that was performed on the specimen in a feedback manner, altering a process such as a fabrication process or step that will be performed on the specimen in a feedforward manner, etc.

Another embodiment of a system is also configured to perform diagnostic functions for a deep learning model. The system includes an imaging tool configured for generating images of a specimen. The imaging tool may have any configuration described herein. The system also includes one or more computer subsystems, e.g., computer subsystem(s) 102 shown in FIG. 1, configured for acquiring the images. The computer subsystem(s) may be configured as described further herein. The system also includes one or more components, e.g., component(s) 100, executed by the one or more computer subsystems, which may include any of the component(s) described herein. The component(s) include deep learning model 104, which may be configured as described herein. For example, the deep learning model is configured for determining information from an image generated for the specimen by the imaging tool. The component(s) also include diagnostic component 106 configured for determining one or more causal portions of the image that resulted in the information being determined and for performing one or more functions based on the determined one or more causal portions of the image. This system embodiment may be further configured as described herein.

Each of the embodiments of each of the systems described above may be combined together into one single embodiment.

Another embodiment relates to a computer-implemented method for performing diagnostic functions for a deep learning model. The method includes determining information from an image generated for a specimen by an imaging tool by inputting the image to a deep learning model. The method also includes determining one or more causal portions of the image that resulted in the information being determined by inputting the information to a diagnostic component In addition, the method includes performing one or more functions based on the determined one or more causal portions of the image with the diagnostic component. The deep learning model and the diagnostic component are included in one or more components executed by one or more computer systems.

Each of the steps of the method may be performed as described further herein. The method may also include any other step(s) that can be performed by the system, computer subsystem(s), and/or imaging tools described herein. The one or more computer systems and the one or more components may be configured according to any of the embodiments described herein, e.g., computer subsystem(s) 102, component(s) 100, deep learning model 104, and diagnostic component 106. In addition, the method described above may be performed by any of the system embodiments described herein.

Figure 5:
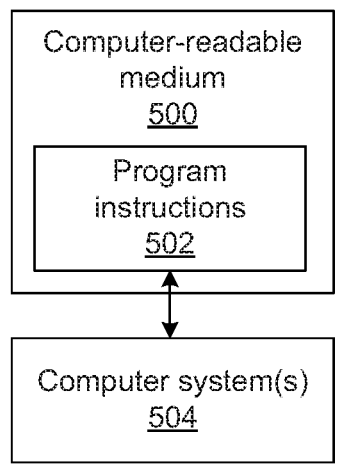
FIG. 5 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for performing diagnostic functions for a deep learning model. One such embodiment is shown in FIG. 5. In particular, as shown in FIG. 5, non-transitory computer-readable medium 500 includes program instructions 502 executable on computer system(s) 504. The computer-implemented method may include any step(s) of any method(s) described herein.

Program instructions 502 implementing methods such as those described herein may be stored on computer-readable medium 500. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 504 may be configured according to any of the embodiments described herein.

Further modifications and alternative embodiments of various aspects of the invention will be apparent to those skilled in the art in view of this description. For example, methods and systems for performing diagnostic functions for a deep learning model are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to perform diagnostic functions for a deep learning model, comprising:
one or more computer subsystems having one or more processors that execute instructions from a memory medium; and
one or more components executed by the one or more computer subsystems and stored on a non-transitory computer-readable medium, wherein the one or more components comprise:
a deep learning model configured for determining information from an image generated for a specimen by an imaging tool;
a diagnostic component configured for determining one or more causal portions of the image that resulted in the information being determined and for performing one or more functions based on the determined one or more causal portions of the image, wherein the one or more causal portions are determined by using causal back propagation to assign causal scores to pixels in an image space corresponding to the image, wherein the one or more functions comprise determining one or more characteristics of the one or more causal portions, and wherein determining the one or more characteristics comprises qualitatively and quantitatively identifying an importance of each pixel of the image input to the deep learning model in contributing to said determining the information;
a visualization component configured for displaying at least the image, the determined information, and the determined one or more causal portions to a user; and
a user interface component configured to receive input from the user after said displaying, wherein the input comprises correct one or more causal portions received from the user after the image, the determined information, and the determined one or more causal portions have been displayed to the user, wherein at least one of the one or more functions comprises determining if the one or more causal portions that resulted in the information being determined are the correct one or more causal portions of the image, wherein the one or more functions further comprise generating an augmented image based on the image and a result of the determining if the one or more causal portions that resulted in the information being determined are the correct one or more causal portions of the image, and wherein the one or more computer subsystems are configured for further training the deep learning model using the augmented image.

2. The system of claim 1, wherein the information comprises a classification for a defect detected on the specimen.

3. The system of claim 1, wherein the information comprises features of the image extracted by the deep learning model.

4. The system of claim 1, wherein the information comprises a simulated image generated from the image.

5. The system of claim 1, wherein the information comprises one or more segmentation regions generated from the image.

6. The system of claim 1, wherein the information comprises a multi-dimensional output generated from the image.

7. The system of claim 1, wherein the deep learning model is a trained deep learning model.

8. The system of claim 1, wherein the deep learning model is further configured as a neural network.

9. The system of claim 1, wherein the one or more functions further comprise altering one or more parameters of the deep learning model based on the determined one or more causal portions.

10. The system of claim 1, wherein the one or more functions performed by the diagnostic component are determined based on the input from the user or input from an additional user.

11. The system of claim 1, wherein the diagnostic component is further configured for determining the one or more causal portions by computing a local sensitivity.

12. The system of claim 1, wherein the causal back propagation is performed using a deconvolution heatmap algorithm.

13. The system of claim 1, wherein the causal back propagation is performed using a layer-wise relevance propagation.

14. The system of claim 1, wherein the causal back propagation is performed using a deep lift algorithm.

15. The system of claim 1, wherein the diagnostic component is further configured for determining the one or more causal portions by global average pooling.

16. The system of claim 1, wherein the diagnostic component is further configured for determining the one or more causal portions by computing a path integral on gradients.

17. The system of claim 1, wherein the diagnostic component is further configured for determining the one or more causal portions by computing a partial dependence plot.

18. The system of claim 1, wherein the diagnostic component is further configured for determining the one or more causal portions by computing a partial dependence plot with path integral.

19. The system of claim 1, wherein the one or more functions further comprise determining, based on the one or more characteristics of the one or more causal portions, if additional images for the specimen should be collected from the imaging tool and used for additional training of the deep learning model.

20. The system of claim 1, wherein the one or more functions further comprise generating a data augmentation method for application to additional images input to the deep learning model.

21. The system of claim 1, wherein the one or more functions further comprise identifying the one or more causal portions as one or more regions of interest in the image and tuning the deep learning model based on the one or more regions of interest.

22. The system of claim 1, wherein the one or more functions further comprise identifying the one or more causal portions as one or more regions of interest in the image and training an additional deep learning model based on the one or more regions of interest.

23. The system of claim 1, wherein the imaging tool is configured as an inspection tool.

24. The system of claim 1, wherein the imaging tool is configured as a metrology tool.

25. The system of claim 1, wherein the imaging tool is configured as an electron beam based imaging tool.

26. The system of claim 1, wherein the imaging tool is configured as an optical based imaging tool.

27. The system of claim 1, wherein the specimen is a wafer.

28. The system of claim 1, wherein the specimen is a reticle.

29. A system configured to perform diagnostic functions for a deep learning model, comprising:
   an imaging tool configured for generating images of a specimen;
   one or more computer subsystems configured for acquiring the images; and
   one or more components executed by the one or more computer subsystems, wherein the one or more components comprise:
      a deep learning model configured for determining information from an image generated for the specimen by the imaging tool;
      a diagnostic component configured for determining one or more causal portions of the image that resulted in the information being determined and for performing one or more functions based on the determined one or more causal portions of the image, wherein the one or more causal portions are determined by using causal back propagation to assign causal scores to pixels in an image space corresponding to the image, wherein the one or more functions comprise determining one or more characteristics of the one or more causal portions, and wherein determining the one or more characteristics comprises qualitatively and quantitatively identifying an importance of each pixel of the image input to the deep learning model in contributing to said determining the information;
      a visualization component configured for displaying at least the image, the determined information, and the determined one or more causal portions to a user; and
      a user interface component configured to receive input from the user after said displaying, wherein the input comprises correct one or more causal portions received from the user after the image, the determined information, and the determined one or more causal portions have been displayed to the user, wherein at least one of the one or more functions comprises determining if the one or more causal portions that resulted in the information being determined are the correct one or more causal portions of the image, wherein the one or more functions further comprise generating an augmented image based on the image and a result of the determining if the one or more causal portions that resulted in the information being determined are the correct one or more causal portions of the image, and wherein the one or more computer subsystems are configured for further training the deep learning model using the augmented image.

30. A non-transitory computer-readable medium, storing program instructions executable on one or more computer systems for performing a computer-implemented method for performing diagnostic functions for a deep learning model, wherein the computer-implemented method comprises:

determining information from an image generated for a specimen by an imaging tool by inputting the image to a deep learning model;

determining one or more causal portions of the image that resulted in the information being determined by inputting the information to a diagnostic component wherein the one or more causal portions are determined by using causal back propagation to assign causal scores to pixels in an image space corresponding to the image;

performing one or more functions based on the determined one or more causal portions of the image with the diagnostic component, wherein the one or more functions comprise determining one or more characteristics of the one or more causal portions, and wherein determining the one or more characteristics comprises qualitatively and quantitatively identifying an importance of each pixel of the image input to the deep learning model in contributing to said determining the information;

displaying at least the image, the determined information, and the determined one or more causal portions to a user with a visualization component; and receiving input from the user after said displaying with a user interface component, wherein the input comprises correct one or more causal portions received from the user after the image, the determined information, and the determined one or more causal portions have been displayed to the user, and wherein at least one of the one or more functions comprises determining if the one or more causal portions that resulted in the information being determined are the correct one or more causal portions of the image;

generating an augmented image based on the image and a result of the determining if the one or more causal portions that resulted in the information being determined are the correct one or more causal portions of the image;

further training the deep learning model using the augmented image; and wherein the deep learning model and the diagnostic component are included in one or more components executed by the one or more computer systems.

31. A computer-implemented method for performing diagnostic functions for a deep learning model, comprising:

determining information from an image generated for a specimen by an imaging tool by inputting the image to a deep learning model;

determining one or more causal portions of the image that resulted in the information being determined by inputting the information to a diagnostic component wherein the one or more causal portions are determined by using causal back propagation to assign causal scores to pixels in an image space corresponding to the image;

performing one or more functions based on the determined one or more causal portions of the image with the diagnostic component, wherein the one or more functions comprise determining one or more characteristics of the one or more causal portions, and wherein determining the one or more characteristics comprises qualitatively and quantitatively identifying an importance of each pixel of the image input to the deep learning model in contributing to said determining the information;

displaying at least the image, the determined information, and the determined one or more causal portions to a user with a visualization component; and receiving input from the user after said displaying with a user interface component, wherein the input comprises correct one or more causal portions received from the user after the image, the determined information, and the determined one or more causal portions have been displayed to the user, wherein at least one of the one or more functions comprises determining if the one or more causal portions that resulted in the information being determined are the correct one or more causal portions of the image;

generating an augmented image based on the image and a result of the determining if the one or more causal portions that resulted in the information being determined are the correct one or more causal portions of the image;

further training the deep learning model using the augmented image; and wherein the deep learning model and the diagnostic component are included in one or more components executed by one or more computer systems.

32. The system of claim 1, wherein qualitatively identifying the importance of said each pixel comprises assigning a positive value for the importance of any of said each pixel that positively contributes to said determining the information.

33. The system of claim 1, wherein qualitatively identifying the importance of said each pixel comprises assigning a negative value for the importance of any of said each pixel that negatively contributes to said determining the information.

34. A system configured to perform diagnostic functions for a deep learning model, comprising:

one or more computer subsystems having one or more processors that execute instructions from a memory medium; and one or more components executed by the one or more computer subsystems and stored on a non-transitory computer-readable medium, wherein the one or more components comprise:

a deep learning model configured for determining information from an image generated for a specimen by an imaging tool;

a diagnostic component configured for determining one or more causal portions of the image that resulted in the information being determined and for performing one or more functions based on the determined one or more causal portions of the image, wherein the one or more causal portions are determined by using causal back propagation to assign causal scores to pixels in an image space corresponding to the image, wherein the one or more functions comprise determining one or more characteristics of the one or more causal portions and altering the image based on the one or more characteristics of the one or more causal portions to thereby generate an augmented image, wherein the one or more computer subsystems are configured for inputting the generated augmented image into the deep learning model, wherein altering the image comprises de-emphasizing one or more non-causal portions of the image, and wherein determining the one or more characteristics comprises qualitatively and quantitatively identifying an importance of each pixel of the image input to the deep learning model in contributing to said determining the information;

a visualization component configured for displaying at least the image, the determined information, and the determined one or more causal portions to a user; and a user interface component configured to receive input from the user after said displaying, wherein the input comprises correct one or more causal portions received from the user after the image, the determined information, and the determined one or more causal portions have been displayed to the user, wherein at least one of the one or more functions comprises determining if the one or more causal portions that resulted in the information being determined are the correct one or more causal portions of the image, wherein altering the image based on the one or more characteristics of the one or more causal portions to thereby generate the augmented image comprises generating the augmented image based on the image and a result of the determining if the one or more causal portions that resulted in the information being determined are the correct one or more causal portions of the image, and wherein the one or more computer subsystems are configured for further training the deep learning model using the augmented image.

35. The system of claim 1, wherein determining if the one or more causal portions are the correct one or more causal portions of the image comprises comparing the determined one or more causal portions to the correct one or more causal portions of the image to determine if the determined one or more causal portions match the correct one or more causal portions.

36. The system of claim 1, wherein determining if the one or more causal portions are the correct one or more causal portions of the image comprises comparing the determined one or more causal portions to the correct one or more causal portions of the image to determine differences between the determined one or more causal portions and the correct one or more causal portions.

37. The system of claim 1, wherein the one or more functions further comprise determining, based on results of determining if the one or more causal portions that resulted in the information being determined are the correct one or more causal portions of the image, if additional images for the specimen should be collected from the imaging tool and used for additional training of the deep learning model.

38. A system configured to perform diagnostic functions for a deep learning model, comprising:

one or more computer subsystems having one or more processors that execute instructions from a memory medium; and one or more components executed by the one or more computer subsystems and stored on a non-transitory computer-readable medium, wherein the one or more components comprise:

a deep learning model configured for determining information from an image generated for a specimen by an imaging tool;

a diagnostic component configured for determining one or more causal portions of the image that resulted in the information being determined and for performing one or more functions based on the determined one or more causal portions of the image, wherein the one or more causal portions are determined by using causal back propagation to assign causal scores to pixels in an image space corresponding to the image;

a visualization component configured for displaying at least the image, the determined information, and the determined one or more causal portions to a user; and a user interface component configured to receive input from the user after said displaying, wherein the input comprises correct one or more causal portions received from the user after the image, the determined information, and the determined one or more causal portions have been displayed to the user, and wherein at least one of the one or more functions comprises determining if the one or more causal portions that resulted in the information being determined are the correct one or more causal portions of the image, wherein the one or more functions comprise generating an augmented image based on the image and a result of the determining if the one or more causal portions that resulted in the information being determined are the correct one or more causal portions of the image, and wherein the one or more computer subsystems are configured for further training the deep learning model using the augmented image.

* * * * *